W. M. Stevenson,

Balanced Valve.

No. 3802. Reissued Jan. 18. 1870.

Horizontal Section.

Transverse Section.

Top of Valve and Case.

Top of Valve.

Bottom of Valve.

Witnesses.

Jacob Eden

J. A. Snow

W. M. Stevenson by his attorney.

N. Eddy

N. PETERS, PHOTO-LITHOGRAPHER, WASHINGTON, D. C.

UNITED STATES PATENT OFFICE.

WILLIAM M. STEVENSON, OF NEWCASTLE, PENNSYLVANIA.

IMPROVEMENT IN BALANCE SLIDE-VALVES.

Specification forming part of Letters Patent No. 83,336, dated October 20, 1868; Reissue No. 3,802, dated January 18, 1870.

*To all whom it may concern:*

Be it known that I, WILLIAM M. STEVENSON, late of Sharon, in the county of Mercer and State of Pennsylvania, but now of Newcastle of the said State, have invented a new and useful Improvement in Balance Slide-Valves for Engines; and I do hereby declare the same to be fully described in the following specification and represented in the accompanying drawings, of which—

Figure 1:
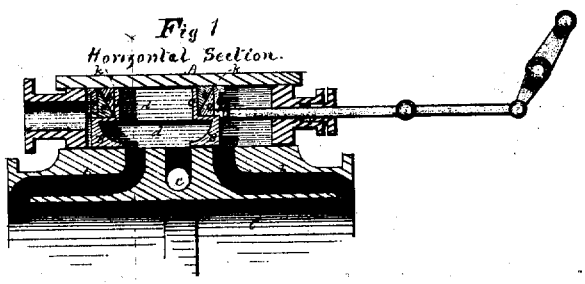
Figure 2:
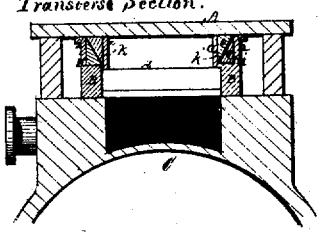
Figure 2:
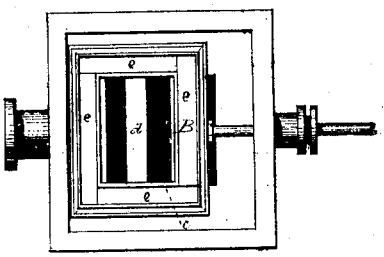
Figure 3:
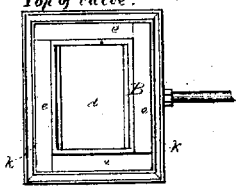
Figure 4:
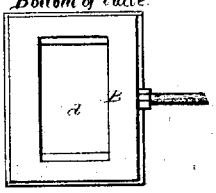

Figure 1 is a vertical section of a steam-chest and the valve thereof as provided with my invention. Fig. 2 is a transverse section of the same. Fig. 3 is a top view, and Fig. 4 a bottom view, of the valve.

The nature of my invention consists in a balanced valve provided with grooves on its upper edge, and having its chamber open both at top and bottom, and a pair of triangular prisms arranged in each groove, and over one or more holes made through the bottom of the grooves, so as to open communication with the groove and the steam-chest, the whole being in manner and so as to operate as hereinafter described.

In order to enable others skilled in the art to construct and use my invention, I will now proceed to describe it and its mode of operation.

The steam-chest is shown at A as provided with a valve, B. The end and side walls of the said valve are shown at *a a*, they being properly formed to operate with the induction-ports *b b* of the cylinder C, the eduction passage or port being exhibited at *c*. Between the said walls is a cavity or chamber, *d*, which is open both at top and bottom, such chamber being formed in manner as represented. Each of the walls of the valve at its top or upper part is furnished with a groove or chamber, K, to receive two packing-strips or right-angled triangular prisms, *e e*, which are arranged in the groove in manner as represented in Fig. 1. One or more holes, *i*, lead out of the lower part of each groove in manner as shown in Figs. 1 and 2, the purpose of such holes being to admit steam from the chest to pass into the groove and underneath the lower of the two prisms or packings and force it upward against the upper one, so as to crowd it both laterally and vertically. The packing-strips, by their forms and by the pressure of the steam, will be forced upward against the cap of the chest and laterally against the sides of the groove, so as to make tight joints against their bearing-surfaces. The valve will be seated or forced downward at the same time, and thus both at top and bottom it will be caused to work with close joints. The cavity *d* between the walls *a a* will be filled with exhaust-steam from the cylinder when steam may be flowing from the chest into either induction-port. The exhaust-steam will cause a downward pressure on the port-laps, such as will nearly, if not entirely, counterbalance the pressure tending to elevate the valve off its seat at the most critical points of the travel of the valve.

What I claim as my invention is—

The improved balanced valve, substantially as described—viz., as constructed not only with a chamber open at top and bottom and with grooves having openings through their bottoms and arranged at the upper part of the valve, as set forth, but with a pair of triangular prismatic packing-strips arranged in each of such grooves, whereby such strips, when forced upward by the steam against the top of the steam-chest to make therewith a close joint, will be caused by their action against each other to be moved laterally against opposite sides of their groove, so as to make close joints with such sides, the whole being as specified.

WM. M. STEVENSON.

Witnesses:

R. H. EDDY,

L. N. MOLLER.